(12) United States Patent
Yamaguchi et al.

(10) Patent No.: US 11,205,939 B2
(45) Date of Patent: Dec. 21, 2021

(54) ROTARY ELECTRIC MACHINE

(71) Applicant: HONDA MOTOR CO., LTD., Tokyo (JP)

(72) Inventors: Tadashi Yamaguchi, Wako (JP); Takuro Kamada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 174 days.

(21) Appl. No.: 16/737,972

(22) Filed: Jan. 9, 2020

(65) Prior Publication Data

US 2020/0227978 A1  Jul. 16, 2020

(30) Foreign Application Priority Data

Jan. 11, 2019  (JP) .............................. JP2019-003256

(51) Int. Cl.
*H02K 9/19* (2006.01)

(52) U.S. Cl.
CPC ...................... *H02K 9/19* (2013.01)

(58) Field of Classification Search
CPC ...... H02K 3/34; H02K 2213/03; H02K 9/193; H02K 9/19; H02K 5/20; H02K 5/225; H02K 1/32; H02K 1/276; H02K 1/2766; H02K 1/20; H02K 1/278; H02K 1/16; H02K 1/24; H02K 1/27
See application file for complete search history.

(56) References Cited

U.S. PATENT DOCUMENTS

2016/0372983 A1\* 12/2016 Okochi ................... H02K 1/32

FOREIGN PATENT DOCUMENTS

| JP | 2011-182573 | 9/2011 |
| JP | 2013-132151 | 7/2013 |
| JP | 5417960 | 2/2014 |
| WO | 2018/030218 | 2/2018 |
| WO | 2018/030219 | 2/2018 |

OTHER PUBLICATIONS

Japanese Office Action for Japanese Patent Application No. 2019-003256 dated Nov. 24, 2020.

\* cited by examiner

*Primary Examiner* — Bryan R Perez
(74) *Attorney, Agent, or Firm* — Amin, Turocy & Watson, LLP

(57) ABSTRACT

A rotary electric machine of the embodiment includes a stator having a cylindrical stator core and a coil attached to the stator core, and a rotor disposed on a radially inward side of the stator, in which the rotor includes a rotor core having a rotor internal flow path through which a refrigerant can flow by axial cooling, and an end surface plate disposed at an end portion in an axial direction of the rotor core, the end surface plate includes a refrigerant flow hole which communicates with the rotor internal flow path, and a refrigerant passage groove which connects together the refrigerant flow hole and an outer circumferential edge of the end surface plate, and a radially outer groove width is equal to or smaller than a radially inner groove width in the refrigerant passage groove when viewed from the axial direction.

4 Claims, 6 Drawing Sheets

ROTARY ELECTRIC MACHINE

CROSS-REFERENCE TO RELATED APPLICATION

Priority is claimed on Japanese Patent Application No. 2019-003256, filed Jan. 11, 2019, the content of which is incorporated herein by reference.

BACKGROUND

Field of the Invention

The present invention relates to a rotary electric machine.

Description of Related Art

In a rotary electric machine mounted on a hybrid automobile, an electric automobile, or the like, a magnetic field is formed in a stator core when a current is supplied to a coil, and thereby a magnetic attractive force or a repulsive force is generated between a magnet of a rotor and the stator core. Thereby, the rotor rotates with respect to the stator.

Since a rotary electric machine generates heat according to its operation, the rotary electric machine is cooled by a refrigerant. For example, a refrigerant flow path is provided inside the rotor from a radially inward side toward a radially outward side. For example, a refrigerant once accumulated in an inner circumferential portion of a rotor is moved from a radially inward side toward a radially outward side through a refrigerant flow path by a centrifugal force according to rotation of the rotor, and thereby the rotary electric machine is cooled by the refrigerant.

Incidentally, when the refrigerant is moved from the radially inward side to the radially outward side through the refrigerant flow path by a centrifugal force according to rotation of the rotor, there is a likelihood that the refrigerant discharged from the refrigerant flow path may enter between an inner circumferential surface of the stator and an outer circumferential surface of the rotor (air gap). When the refrigerant enters between the inner circumferential surface of the stator and the outer circumferential surface of the rotor, the refrigerant acts as resistance to rotation of the rotor, and thus there is a likelihood that a rotation efficiency of the rotary electric machine may be decreased. Therefore, various configurations for improving a rotation efficiency of a rotary electric machine have been studied.

For example, Japanese Patent No. 5417960 discloses a structure in which a wall body which is axially adjacent to an axial end surface of a rotor and is radially adjacent to an inner circumferential surface of a stator is provided, and the wall body is provided on the inner circumferential surface side of the stator with respect to a refrigerant outflow opening. In Japanese Patent No. 5417960, a refrigerant flowing out from the outflow opening is inhibited from entering between the inner circumferential surface of the stator and the outer circumferential surface of the rotor by the wall body.

SUMMARY

However, if the wall body is provided on the inner circumferential surface side of the stator with respect to the refrigerant outflow opening, since a refrigerant flowing out from the outflow opening is blocked by the wall body, the refrigerant cannot be easily dispersed to the coil of the stator, and thus there is a likelihood of the coil not being cooled efficiently.

The present invention is to provide a rotary electric machine in which a rotation efficiency thereof is improved and a coil can be efficiently cooled.

SUMMARY OF THE INVENTION

A rotary electric machine according to the present invention employs the following configuration.

(1) A rotary electric machine according to one aspect of the present invention including: a stator having a cylindrical stator core and a coil attached to the stator core, and a rotor disposed on a radially inward side of the stator, in which the rotor includes a rotor core having a refrigerant flow path through which a refrigerant is able to flow by axial cooling, and an end surface plate disposed at an end portion in an axial direction of the rotor core, the end surface plate includes a refrigerant flow hole which communicates with the refrigerant flow path, and a refrigerant passage groove which connects together the refrigerant flow hole and an outer circumferential edge of the end surface plate, and a width of a portion of the refrigerant passage groove in contact with the outer circumferential edge is equal to or smaller than a width of a portion of the refrigerant passage groove in contact with the refrigerant flow hole when viewed from the axial direction.

(2) In the above mentioned aspect of (1), the width of the portion of the refrigerant passage groove in contact with the outer circumferential edge may be smaller than the width of the portion of the refrigerant passage groove in contact with the refrigerant flow hole when viewed from the axial direction.

(3) In the aspect of above mentioned (1) or (2), a depth of the portion of the refrigerant passage groove in contact with the outer circumferential edge may be equal to or smaller than a depth of the portion of the refrigerant passage groove in contact with the refrigerant flow hole.

(4) In one aspect of any one of above mentioned (1) to (3), when viewed from the axial direction, the refrigerant flow hole may have a triangular shape having an apex part on a radially outward side, and the refrigerant passage groove may extend from the apex part toward the outer circumferential edge.

According to the above mentioned aspect of (1), the end surface plate includes the refrigerant passage groove connecting the refrigerant flow hole and the outer circumferential edge of the end surface plate, and thereby a refrigerant that has flowed out from the refrigerant flow hole can be caused to flow along the refrigerant passage groove by a centrifugal force according to rotation of the rotor. Therefore, the refrigerant that has flowed out from the refrigerant flow hole can be inhibited from wet-spreading toward the outer circumferential edge of the end surface plate due to a surface tension compared to a case in which the refrigerant passage groove is not provided. In addition, when a width of a portion of the refrigerant passage groove in contact with the outer circumferential edge is equal to or smaller than a width of a portion of the refrigerant passage groove in contact with the refrigerant flow hole when viewed from the axial direction, a flow velocity of the refrigerant flowing through the portion of the refrigerant passage groove in contact with the outer circumferential edge can be increased compared to a case in which a width of the portion of the refrigerant passage groove in contact with the outer circumferential edge is larger than a width of the portion of the refrigerant passage groove in contact with the refrigerant flow hole when viewed from the axial direction. Therefore, the refrigerant flowing through the refrigerant passage groove can be made easier to be ejected outward in the radial direction by a centrifugal force according to the rotation of the rotor. In addition, the refrigerant that has flowed out from the refrigerant flow hole is more likely to be dispersed to the coil of the stator compared to a structure in which a wall body is provided on an inner circumferential surface side of the stator. Therefore, a rotation efficiency of the rotary electric machine can be improved and the coil can be efficiently cooled.

According to the above mentioned aspect of (2), when a width of the portion of the refrigerant passage groove in contact with the outer circumferential edge is smaller than a width of the portion of the refrigerant passage groove in contact with the refrigerant flow hole when viewed from the axial direction, a flow velocity of the refrigerant flowing through the portion of the refrigerant passage groove in contact with the outer circumferential edge can be increased compared to a case in which a width of the portion of the refrigerant passage groove in contact with the outer circumferential edge is equal to or larger than a width of the portion of the refrigerant passage groove in contact with the refrigerant flow hole when viewed from the axial direction. Therefore, the refrigerant flowing through the refrigerant passage groove can be made much easier to be ejected outward in the radial direction by a centrifugal force according to the rotation of the rotor.

According to the above mentioned aspect of (3), when a depth of the portion of the refrigerant passage groove in contact with the outer circumferential edge is equal to or smaller than a depth of the portion of the refrigerant passage groove in contact with the refrigerant flow hole, a flow velocity of the refrigerant flowing through the portion of the refrigerant passage groove in contact with the outer circumferential edge can be increased compared to a case in which a depth of the portion of the refrigerant passage groove in contact with the outer circumferential edge is larger than a depth of the portion of the refrigerant passage groove in contact with the refrigerant flow hole. Therefore, the refrigerant flowing through the refrigerant passage groove can be made much easier to be ejected outward in the radial direction by a centrifugal force according to the rotation of the rotor. In addition, a weight balance of the end surface plate can be adjusted by adjusting a depth of the refrigerant passage groove.

According to the above mentioned aspect of (4), the refrigerant flow hole has a triangular shape having the apex part on the radially outward side when viewed from the axial direction, the refrigerant passage groove extends from the apex part toward the outer circumferential edge, and thereby the refrigerant accumulating at the apex part of the refrigerant flow hole can be caused to flow smoothly along the refrigerant passage groove by a centrifugal force according to the rotation of the rotor.

DETAILED DESCRIPTION OF THE INVENTION

Hereinafter, embodiments of the present invention will be described with reference to the drawings. In the embodiments, description will be made by taking a rotary electric machine (traveling motor) mounted on a vehicle such as a hybrid automobile or an electric automobile.

First Embodiment

Rotary Electric Machine

Figure 1:
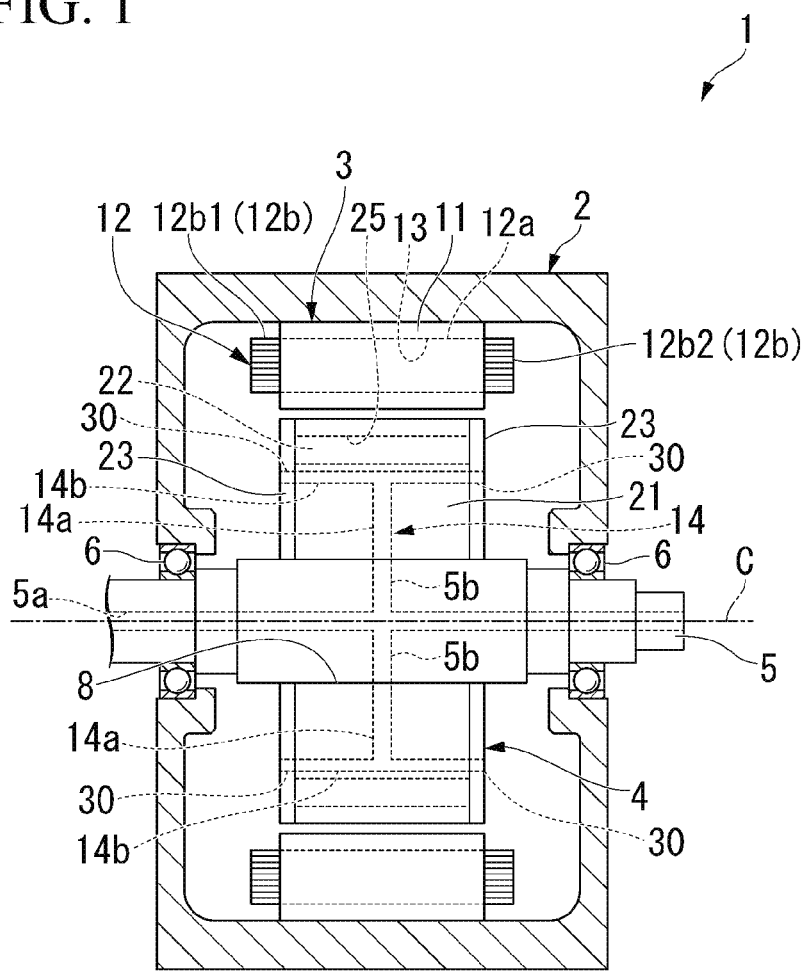
FIG. 1 is a schematic configuration view showing a rotary electric machine according to a first embodiment.

FIG. 1 is a schematic configuration view showing an overall configuration of a rotary electric machine 1 according to a first embodiment. FIG. 1 is a view including a cross section taken along a virtual plane including an axis C.

As shown in FIG. 1, the rotary electric machine 1 includes a case 2, a stator 3, a rotor 4, an output shaft 5, and a refrigerant supply mechanism (not shown).

The case 2 has a cylindrical box shape that houses the stator 3 and the rotor 4. A refrigerant (not shown) is accommodated in the case 2. A portion of the stator 3 is disposed in a state of being immersed in the refrigerant in the case 2. For example, as the refrigerant, an automatic transmission fluid (ATF), which is a hydraulic oil used for transmission lubrication, power transmission, or the like, or the like may be used.

The output shaft 5 is rotatably supported by the case 2. Reference 6 in FIG. 1 indicates a bearing that rotatably supports the output shaft 5. Hereinafter, a direction along the axis C of the output shaft 5 is referred to as an "axial direction," a direction perpendicular to the axis C is referred to as a "radial direction," and a direction around the axis C is referred to as a "circumferential direction."

The output shaft 5 includes an axial refrigerant path 5a provided concentrically with the output shaft 5, and a radial refrigerant path 5b extending radially outward from the axial refrigerant path 5a. A plurality of radial refrigerant paths 5b are disposed at intervals in the circumferential direction. In the example of FIG. 1, the radial refrigerant paths 5b extend radially outward from a central portion in the axial direction of the axial refrigerant path 5a and open at an outer circumferential surface of the output shaft 5.

The stator 3 includes a stator core 11 and a coil 12 attached to the stator core 11.

The stator core 11 has a cylindrical shape disposed coaxially with the axis C. The stator core 11 is fixed to an inner circumferential surface of the case 2. For example, the stator core 11 may be configured by laminating electromagnetic steel sheets in the axial direction. Further, the stator core 11 may be a so-called dust core obtained by compression-molding a metal magnetic powder.

The coil 12 is attached to the stator core 11. The coil 12 includes a U-phase coil, a V-phase coil, and a W-phase coil which are disposed with a phase difference of 120° with respect to each other in the circumferential direction. The coil 12 includes an insertion part 12a inserted into a slot 13 of the stator core 11, and a coil end part 12b protruding from the stator core 11 in the axial direction. A magnetic field is generated in the stator core 11 when a current flows through the coil 12. In FIG. 1, reference 12b1 indicates a first coil end part, and reference 12b2 indicates a second coil end part positioned on a side opposite to the first coil end part 12b1 in the axial direction.

The rotors 4 are disposed at intervals on a radially inward side with respect to the stator 3. The rotor 4 is fixed to the output shaft 5. The rotor 4 is configured to be rotatable around the axis C integrally with the output shaft 5. The rotor 4 includes a rotor core 21, a magnet 22, and an end surface plate 23. In the embodiment, the magnet 22 is a permanent magnet.

The rotor core 21 has a cylindrical shape disposed coaxially with the axis C. The output shaft 5 is press-fitted and fixed to a radially inward side of the rotor core 21. As in the stator core 11, the rotor core 21 may be configured by laminating electromagnetic steel sheets in the axial direction or may be a dust core.

A magnet holding hole 25 penetrating the rotor core 21 in the axial direction is provided on an outer circumferential portion of the rotor core 21. A plurality of magnet holding holes 25 are disposed at intervals in the circumferential direction. The magnet 22 is inserted into each of the magnet holding holes 25.

The rotor core 21 includes a rotor internal flow path 14 (refrigerant flow path) through which a refrigerant can flow by axial cooling. The rotor internal flow path 14 is disposed between the output shaft 5 (a shaft insertion hole 8) and the magnets 22 (the magnet holding holes 25) in the radial direction.

The rotor internal flow path 14 includes a radial flow path 14a extending in the radial direction and an axial flow path 14b extending in the axial direction. The radial flow path 14a allows the radial refrigerant path 5b of the output shaft 5 and the axial flow path 14b of the rotor internal flow path 14 to communicate with each other. The axial flow path 14b allows a refrigerant flow hole 30 of the end surface plate 23 and the radial flow path 14a of the rotor internal flow path 14 to communicate with each other. A plurality of radial flow paths 14a and axial flow paths 14b are disposed at intervals in the circumferential direction.

The end surface plate 23 is disposed at both end portions in the axial direction with respect to the rotor core 21. The output shaft 5 is press-fitted and fixed to a radially inward side of the end surface plates 23. The end surface plates 23 cover at least the magnet holding holes 25 in the rotor core 21 from both end sides in the axial direction. The end surface plates 23 are in contact with outer end surfaces of the rotor core 21 in the axial direction.

Figure 2:
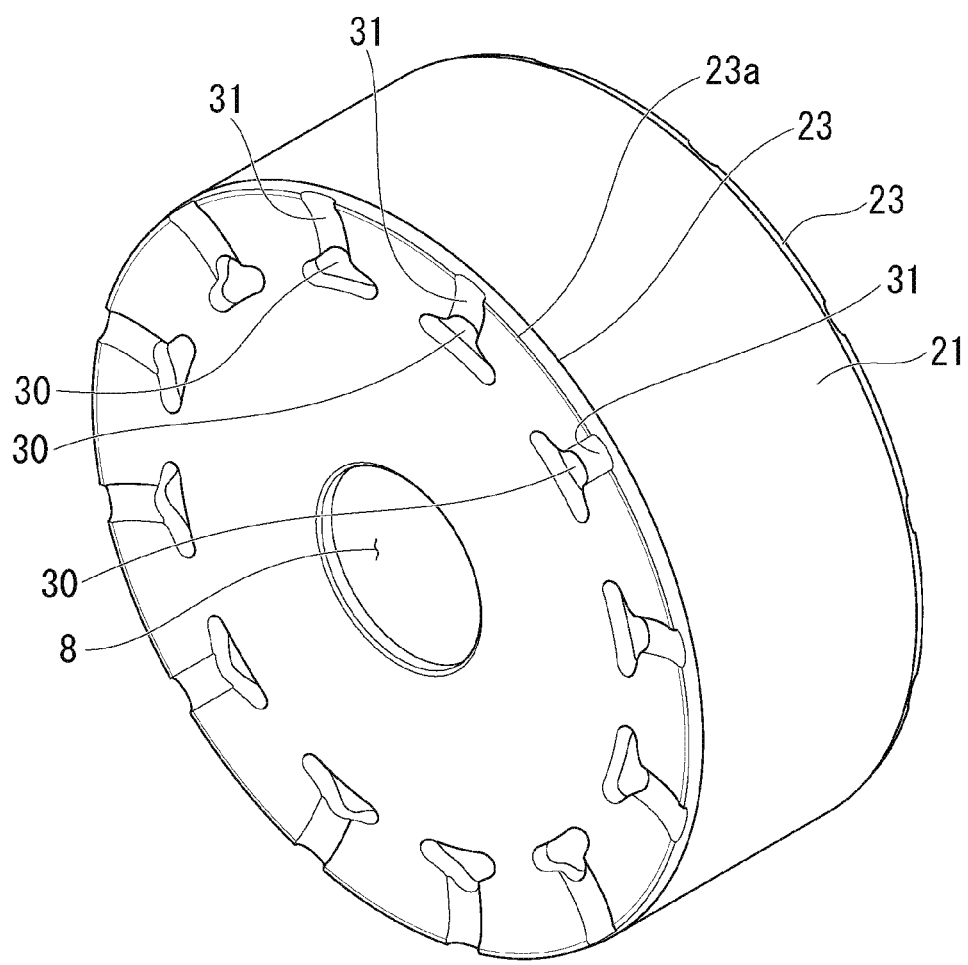
FIG. 2 is a perspective view of a rotor according to the first embodiment.

FIG. 2 is a perspective view of the rotor 4 according to the first embodiment.

As shown in FIG. 2, each of the end surface plates 23 includes the refrigerant flow hole 30 communicating with the rotor internal flow path 14 (see FIG. 1), and a refrigerant passage groove 31 connecting the refrigerant flow hole 30 and an outer circumferential edge 23a of the end surface plate 23. A plurality (for example, twelve in the present embodiment) of refrigerant flow holes 30 and refrigerant passage grooves 31 are disposed at intervals in the circumferential direction.

Figure 3:
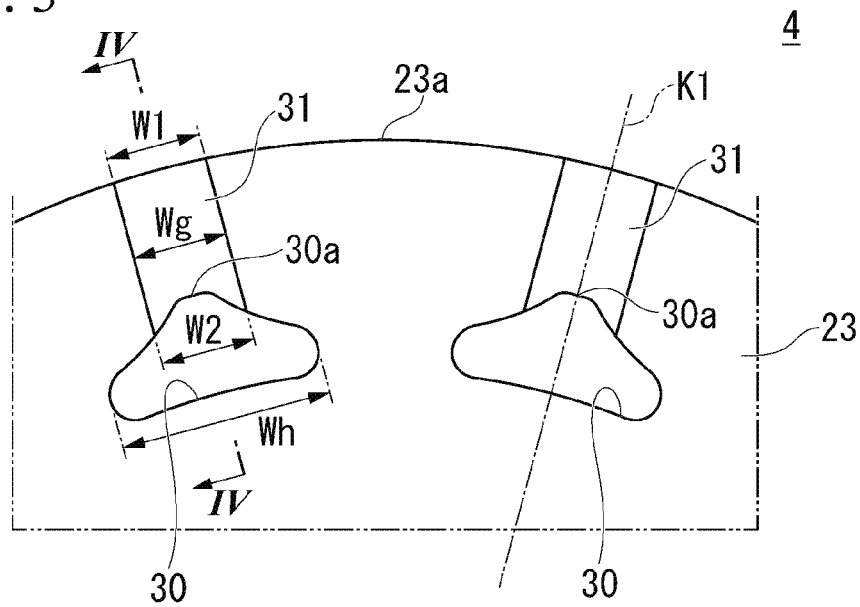
FIG. 3 is an enlarged view showing a main portion of the rotor according to the first embodiment when viewed from an axial direction.

FIG. 3 is an enlarged view showing a main portion of the rotor 4 according to the first embodiment when viewed from the axial direction.

When viewed from the axial direction, each of the refrigerant flow holes 30 has a triangular shape having an apex part 30a on a radially outward side. When viewed from the axial direction, each corner portion of the refrigerant flow hole 30 has a rounded corner shape. When viewed from the axial direction, the apex part 30a has a curved shape that is convex radially outward. Reference K1 in the drawing indicates a virtual straight line passing through an axis of the output shaft 5 (the axis C shown in FIG. 1) and the apex part 30a (radially outer end) of the refrigerant flow hole 30. When viewed from the axial direction, the refrigerant flow hole 30 is formed to be line-symmetrical with the virtual straight line K1 as an axis of symmetry.

When viewed from the axial direction, the refrigerant passage groove 31 extends from the apex part 30a of the refrigerant flow hole 30 toward the outer circumferential edge 23a of the end surface plate 23. When viewed from the axial direction, the refrigerant passage groove 31 extends in a straight line along the virtual straight line K1. A width Wg of the refrigerant passage groove 31 is smaller than a maximum width Wh of the refrigerant flow hole 30. Here, the width Wg of the refrigerant passage groove 31 means a length of a straight line (shortest distance) connecting a first edge and a second edge of the refrigerant passage groove 31 in the circumferential direction. The maximum width Wh of the refrigerant flow hole 30 means the length of a straight line (shortest distance) connecting a first outer edge and a second outer edge of the refrigerant flow hole 30 in the circumferential direction.

When viewed from the axial direction, a width W1 (hereinafter also referred to as a "radially outer groove width W1") of a portion of the refrigerant passage groove 31 in contact with the outer circumferential edge 23a of the end surface plate 23 is substantially the same as a width W2 (hereinafter also referred to as a "radially inner groove width W2") of a portion of the refrigerant passage groove 31 in contact with the refrigerant flow hole 30 (W1≈W2).

Figure 4:
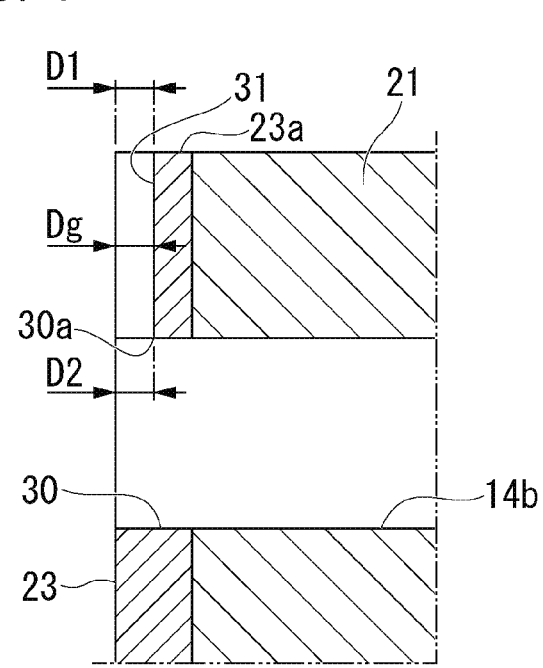
FIG. 4 is a cross-sectional view taken along line IV-IV in FIG. 3.

FIG. 4 is a cross-sectional view taken along line IV-IV of FIG. 3.

In a cross-sectional view, a depth Dg of the refrigerant passage groove 31 is substantially the same depth in the radial direction. Here, the depth Dg of the refrigerant passage groove 31 means a length of a straight line (shortest distance) connecting a surface of the end surface plate 23 and a bottom surface of the refrigerant passage groove 31 in the axial direction. A depth D1 (hereinafter also referred to as a "radially outer groove depth D1") of the portion of the refrigerant passage groove 31 in contact with the outer circumferential edge 23a of the end surface plate 23 is substantially the same as a depth D2 (hereinafter also referred to as a "radially inner groove depth D2") of the portion of the refrigerant passage groove 31 in contact with the refrigerant flow hole 30 (D1≈D2).

Flow of Refrigerant

Hereinafter, a flow of a refrigerant in the first embodiment will be described with reference to FIG. 1 and the like.

In the embodiment, axial cooling is performed using the axial refrigerant path 5a provided in the output shaft 5. A refrigerant is supplied to the axial refrigerant path 5a by a refrigerant supply mechanism (not shown). Due to a centrifugal force according to rotation of the rotor 4, a force directed toward a radially outward side acts on the refrigerant. The refrigerant supplied to the axial refrigerant path 5a is supplied to the rotor internal flow path 14 through the radial refrigerant path 5b by the centrifugal force. The refrigerant supplied to the rotor internal flow path 14 passes through the radial flow path 14a and the axial flow path 14b and is discharged from the refrigerant flow hole 30 to the outside of the rotor 4. As described above, the rotor core 21 is cooled by the refrigerant moving through the rotor internal flow path 14.

Some of the refrigerant discharged to the outside of the rotor 4 disperses toward the coil end part 12b.

Also, some of the remainder of the refrigerant discharged to the outside of the rotor 4 moves radially outward along the refrigerant passage groove 31 and disperses toward the coil end part 12b. Thereby, the coil 12 is cooled.

Operation

Hereinafter, an operation of the rotary electric machine 1 of the first embodiment will be described.

First, a comparative example will be described.

Figure 5:
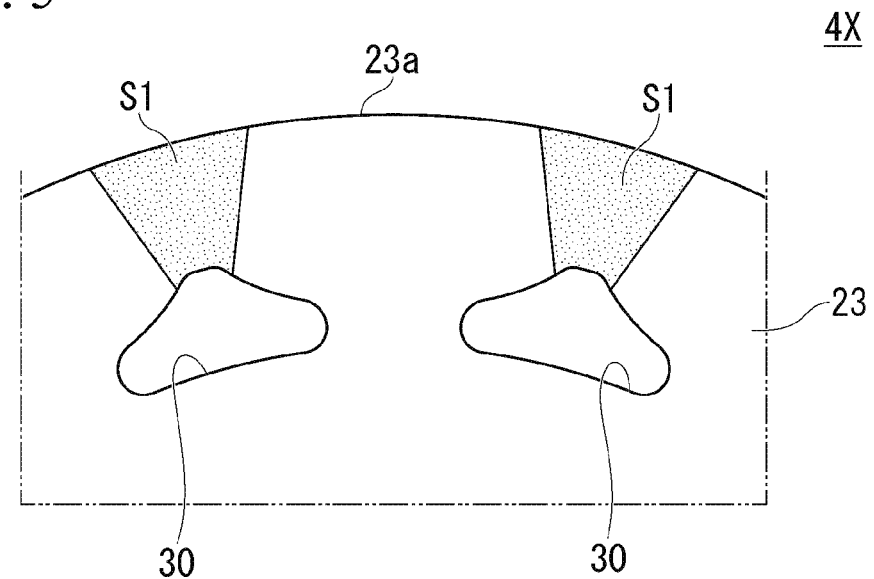
FIG. 5 is an enlarged view showing a main portion of a rotor according to a comparative example when viewed from the axial direction.

FIG. 5 is an enlarged view showing a main portion of a rotor 4X according to the comparative example when viewed from the axial direction.

As shown in FIG. 5, the rotor 4X in the comparative example does not have the refrigerant passage groove 31 in the embodiment. In the comparative example, a refrigerant that has flowed out from the refrigerant flow hole 30 wet-spreads toward the outer circumferential edge 23a of the end surface plate 23 due to a surface tension. Reference S1 in the drawing indicates a region in which the refrigerant wet-spreads from the refrigerant flow hole 30 toward the outer circumferential edge 23a of the end surface plate 23.

In the comparative example, there is a high likelihood of the refrigerant that has wet-spread toward the outer circumferential edge 23a of the end surface plate 23 entering between an inner circumferential surface of the stator and an outer circumferential surface of the rotor (air gap). Therefore, in the comparative example, the refrigerant that has entered between the inner circumferential surface of the stator and the outer circumferential surface of the rotor acts as resistance to rotation of the rotor, and thus there is a likelihood that a rotation efficiency of the rotary electric machine may be decreased.

Next, the first embodiment will be described.

In the first embodiment, the refrigerant passage groove 31 connecting the refrigerant flow hole 30 and the outer circumferential edge 23a of the end surface plate 23 is provided on the end surface plate 23 (see FIG. 3). Therefore, the refrigerant that has flowed out from the refrigerant flow hole 30 can be caused to flow along the refrigerant passage groove 31 by a centrifugal force according to the rotation of the rotor 4.

In addition, the radially outer groove width W1 is substantially the same as the radially inner groove width W2 in the refrigerant passage groove 31 (see FIG. 3, W1≈W2). Therefore, a flow velocity of the refrigerant flowing through the portion of the refrigerant passage groove 31 in contact with the outer circumferential edge 23a can be increased compared to a case in which the radially outer groove width W1 is larger than the radially inner groove width W2 in the refrigerant passage groove 31. Here, when a flow rate of the refrigerant flowing through the refrigerant passage groove 31 is Q, a cross-sectional area of the refrigerant passage groove 31 is A, and a flow velocity of the refrigerant flowing through the refrigerant passage groove 31 is V, the following Expression (1) is established. Further, the cross-sectional area of the refrigerant passage groove 31 means an area of a cross section obtained by cutting the refrigerant passage groove 31 along a plane perpendicular to a direction (virtual straight line K1) in which the refrigerant passage groove 31 extends.

$$Q = A \times V \tag{1}$$

From Expression (1) above, when the flow rate Q is constant, the flow velocity V decreases as the cross-sectional area A increases. That is, when a flow rate through the refrigerant passage groove 31 is constant, if the radially outer groove width W1 is larger than the radially inner groove width W2 in the refrigerant passage groove 31, the flow velocity of the refrigerant flowing through the portion of the refrigerant passage groove 31 in contact with the outer circumferential edge 23a is decreased. Also, when a flow rate through the refrigerant passage groove 31 is constant, if the radially outer groove depth D1 is larger than the radially inner groove depth D2 in the refrigerant passage groove 31, the flow velocity of the refrigerant flowing through the portion of the refrigerant passage groove 31 in contact with the outer circumferential edge 23a is decreased.

On the other hand, in the first embodiment, the radially outer groove width W1 is substantially the same as the radially inner groove width W2 in the refrigerant passage groove 31. Therefore, a flow velocity of the refrigerant flowing through the portion of the refrigerant passage groove 31 in contact with the outer circumferential edge 23a can be increased compared to the case in which the radially outer groove width W1 is larger than the radially inner groove width W2 in the refrigerant passage groove 31.

Also, the radially outer groove depth D1 is substantially the same as the radially inner groove depth D2 in the refrigerant passage groove 31. Therefore, a flow velocity of the refrigerant flowing through the portion of the refrigerant passage groove 31 in contact with the outer circumferential edge 23a can be increased compared to the case in which the radially outer groove depth D1 is larger than the radially inner groove depth D2 in the refrigerant passage groove 31.

Therefore, the refrigerant flowing through the refrigerant passage groove 31 can be made easier to be ejected outward in the radial direction by a centrifugal force according to the rotation of the rotor 4. The refrigerant that has been ejected radially outward from the refrigerant passage groove 31 is less likely to enter between the inner circumferential surface of the stator 3 and the outer circumferential surface of the rotor 4. Accordingly, in the first embodiment, a likelihood of the refrigerant acting as resistance to the rotation of the rotor 4 is low, and thus a likelihood of the rotation efficiency of the rotary electric machine 1 being decreased is low.

As described above, the rotary electric machine 1 according to the above-described embodiment includes the stator 3 having the cylindrical stator core 11 and the coil 12 attached to the stator core 11, and the rotor 4 disposed on the radially inward side of the stator 3, the rotor 4 includes the rotor core 21 having the rotor internal flow path 14 through which a refrigerant can flow by axial cooling, and the end surface plate 23 disposed at an end portion in the axial direction of the rotor core 21, the end surface plate 23 includes the refrigerant flow hole 30 communicating with the rotor internal flow path 14, and the refrigerant passage groove 31 connecting the refrigerant flow hole 30 and the outer circumferential edge 23a of the end surface plate 23, and the radially outer groove width W1 is substantially the same as the radially inner groove width W2 in the refrigerant passage groove 31 when viewed from the axial direction.

According to this configuration, the end surface plate 23 includes the refrigerant passage groove 31 connecting the refrigerant flow hole 30 and the outer circumferential edge 23a of the end surface plate 23, and thereby the refrigerant that has flowed out from the refrigerant flow hole 30 can be caused to flow along the refrigerant passage groove 31 by a centrifugal force according to the rotation of the rotor 4. Therefore, the refrigerant that has flowed out from the refrigerant flow hole 30 can be inhibited from wet-spreading toward the outer circumferential edge 23a of the end surface plate 23 due to a surface tension compared to a case in which the refrigerant passage groove 31 is not provided. In addition, the radially outer groove width W1 is substantially the same as the radially inner groove width W2 in the refrigerant passage groove 31 when viewed from the axial direction, and thereby a flow velocity of the refrigerant flowing through the portion of the refrigerant passage groove 31 in contact with the outer circumferential edge 23a can be increased compared to a case in which the radially outer groove width W1 is larger than the radially inner groove width W2 in the refrigerant passage groove 31 when viewed from the axial direction. Therefore, the refrigerant flowing through the refrigerant passage groove 31 can be made easier to be ejected outward in the radial direction by a centrifugal force according to the rotation of the rotor 4. In addition, the refrigerant that has flowed out from the refrigerant flow hole 30 is more likely to be dispersed to the coil 12 of the stator 3 compared to a structure in which a wall body is provided on the inner circumferential surface side of the stator. Therefore, a rotation efficiency of the rotary electric machine 1 can be improved and the coil 12 can be efficiently cooled. In addition, the refrigerant passage groove 31 is provided on the end surface plates 23 on both sides in the axial direction, and thereby both the first coil end part 12b1 and the second coil end part 12b2 can be cooled. Accordingly, the coil 12 can be cooled more efficiently compared to a case in which the refrigerant passage groove 31 is provided on only one side of the end surface plates 23.

In the above-described embodiment, when the radially outer groove depth D1 is substantially the same as the radially inner groove depth D2 in the refrigerant passage groove 31, the following effects are achieved.

A flow velocity of the refrigerant flowing through the portion of the refrigerant passage groove 31 in contact with the outer circumferential edge 23a can be increased compared to a case in which the radially outer groove depth D1 is larger than the radially inner groove depth D2 in the refrigerant passage groove 31. Therefore, the refrigerant flowing through the refrigerant passage groove 31 can be made much easier to be ejected outward in the radial direction by a centrifugal force according to the rotation of the rotor 4. In addition, a weight balance of the end surface plate 23 can be adjusted by adjusting the depth Dg of the refrigerant passage groove 31.

In the above-described embodiment, when the refrigerant flow hole 30 has a triangular shape having the apex part 30a on the radially outward side when viewed from the axial direction, and the refrigerant passage groove 31 extends from the apex part 30a toward the outer circumferential edge 23a, the following effects are achieved.

The refrigerant accumulating at the apex part 30a of the refrigerant flow hole 30 can be caused to flow smoothly along the refrigerant passage groove 31 by a centrifugal force according to the rotation of the rotor 4.

In the above-described embodiment, description has been made by taking an example in which the radially outer groove depth D1 is substantially the same as the radially inner groove depth D2 in the refrigerant passage groove 31, but the present invention is not limited thereto.

Figure 6:
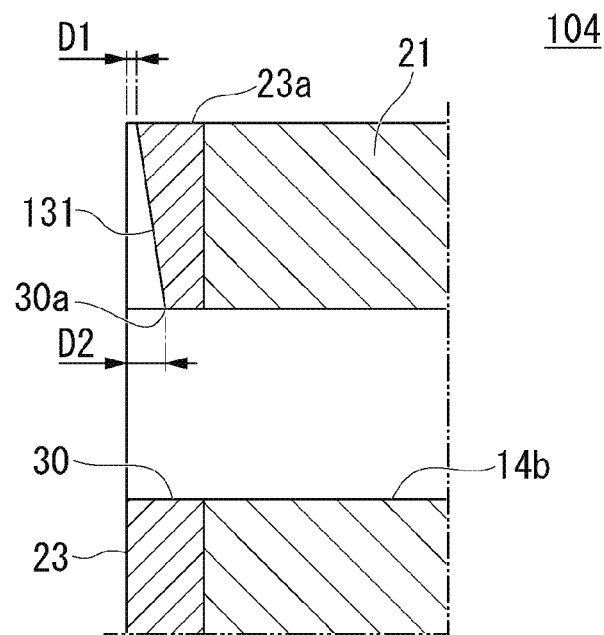
FIG. 6 is a cross-sectional view of a refrigerant passage groove according to a modified example of the first embodiment.

FIG. 6 is a cross-sectional view of a refrigerant passage groove 131 according to a modified example of the first embodiment. FIG. 6 corresponds to FIG. 4 of the first embodiment. In the present modified example, constituents the same as those in the first embodiment will be denoted by the same references, and detailed description thereof will be omitted.

As shown in FIG. 6, the radially outer groove depth D1 in the refrigerant passage groove 131 may be smaller than the radially inner groove depth D2 in the refrigerant passage groove 131. In a cross-sectional view, the refrigerant passage groove 131 is inclined such that a radially inner end of the refrigerant passage groove 131 is deepest and a radially outer end of the refrigerant passage groove 131 is shallowest. In other words, a bottom surface of the refrigerant passage groove 131 is inclined in the radial direction so that a groove depth thereof gradually decreases toward a radially outward side.

From Expression (1) above, when the flow rate Q is constant, the flow velocity V increases as the cross-sectional area A decreases. That is, when a flow rate through the refrigerant passage groove 131 is constant, if the radially outer groove depth D1 is smaller than the radially inner groove depth D2 in the refrigerant passage groove 131, a flow velocity of the refrigerant flowing through a portion of the refrigerant passage groove 131 in contact with the outer circumferential edge 23a is increased.

According to the present modified example, when the radially outer groove depth D1 is smaller than the radially inner groove depth D2 in the refrigerant passage groove 131, the following effects are achieved.

The flow velocity of the refrigerant flowing through the portion of the refrigerant passage groove 131 in contact with the outer circumferential edge 23a can be increased compared to a case in which the radially outer groove depth D1 is equal to or larger than the radially inner groove depth D2 in the refrigerant passage groove 131. Therefore, the refrigerant flowing through the refrigerant passage groove 131 can be made much easier to be ejected outward in the radial direction by a centrifugal force according to rotation of a rotor 104. In addition, a weight balance of the end surface plate 23 can be adjusted by adjusting the depth Dg of the refrigerant passage groove 131.

Second Embodiment

In first embodiment, description has been made by taking an example in which the radially outer groove width W1 is substantially the same as the radially inner groove width W2 in the refrigerant passage groove 31, but the present invention is not limited thereto.

Figure 7:
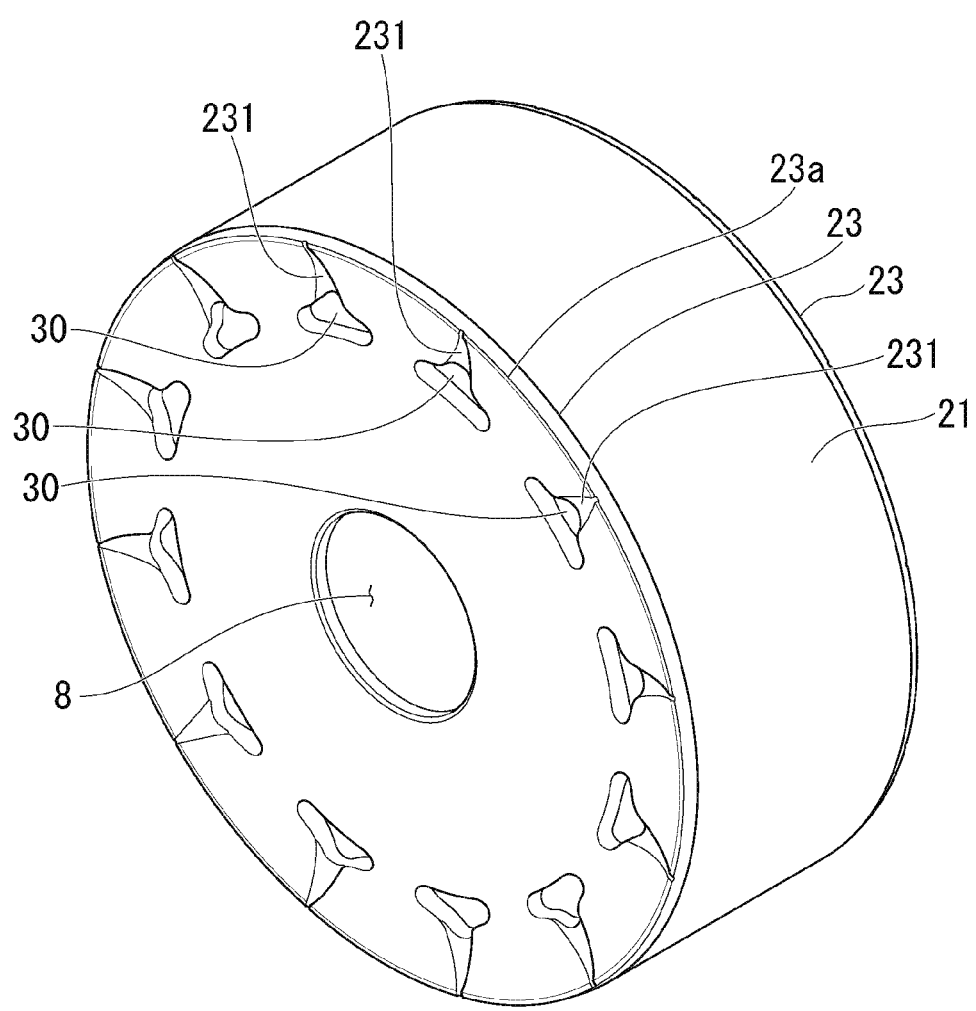
FIG. 7 is a perspective view of a rotor according to a second embodiment.

FIG. 7 is a perspective view of a rotor 204 according to a second embodiment. FIG. 7 corresponds to FIG. 2 of the first embodiment.

Figure 8:
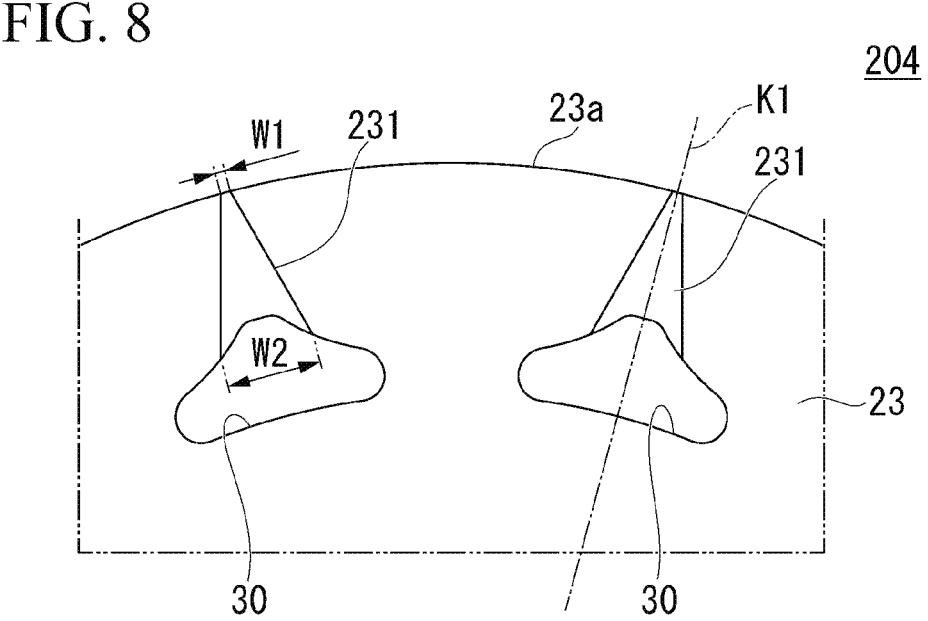
FIG. 8 is an enlarged view showing a main portion of the rotor according to the second embodiment when viewed from the axial direction.

FIG. 8 is an enlarged view showing a main portion of the rotor 204 according to the second embodiment when viewed from the axial direction. FIG. 8 corresponds to FIG. 3 of the first embodiment.

In the second embodiment, constituents the same as those in the first embodiment will be denoted by the same references, and a detailed description thereof will be omitted.

As shown in FIG. 8, a radially outer groove width W1 in a refrigerant passage groove 231 may be smaller than a radially inner groove width W2 in the refrigerant passage groove 231. When viewed from the axial direction, the refrigerant passage groove 231 extends such that a radially inner end of the refrigerant passage groove 231 is widest and a radially outer end of the refrigerant passage groove 231 is narrowest. In other words, an outer shape of the refrigerant passage groove 231 has a tapered shape that is tapered off toward a radially outward side. When viewed from the axial direction, the refrigerant passage groove 231 is formed to be line-symmetrical with a virtual straight line K1 as an axis of symmetry.

From Expression (1) above, when a flow rate Q is constant, a flow velocity V increases as a cross-sectional area A decreases. That is, when a flow rate through the refrigerant passage groove 231 is constant, if the radially outer groove width W1 is smaller than the radially inner groove width W2 in the refrigerant passage groove 231, a flow velocity of a refrigerant flowing through a portion of the refrigerant passage groove 231 in contact with an outer circumferential edge 23a is increased.

According to the second embodiment, when the radially outer groove width W1 is smaller than the radially inner groove width W2 in the refrigerant passage groove 231 when viewed from the axial direction, the following effects are achieved.

A flow velocity of the refrigerant flowing through the portion of the refrigerant passage groove 231 in contact with the outer circumferential edge 23a can be increased compared to a case in which the radially outer groove width W1 is equal to or larger than the radially inner groove width W2 in the refrigerant passage groove 231 when viewed from the axial direction. Therefore, the refrigerant flowing through the refrigerant passage groove 231 can be made much easier to be ejected outward in the radial direction by a centrifugal force according to rotation of the rotor 204.

In the above-described embodiment, description has been made by taking an example in which the rotary electric machine 1 is a traveling motor mounted on a vehicle such as a hybrid automobile or an electric automobile, but the present invention is not limited to thereto. For example, the rotary electric machine 1 may be power generation motors, motors for other applications, or rotary electric machines (including generators) other than a vehicle application.

In the above-described embodiment, description has been made by taking an example in which the axial cooling is performed using the axial refrigerant path 5a provided in the output shaft 5, but the present invention is not limited to thereto. For example, a refrigerant may be supplied to the magnet 22 along a guide wall (not shown) provided on the end surface plate 23 by rotation of the rotor 4. For example, a refrigerant may be supplied to an opening part of the end surface plate 23 through a supply port provided in the case 2 or the like.

In the above-described embodiment, description has been made by taking an example in which the refrigerant passage groove is provided on the end surface plates on both sides in the axial direction, but the present invention is not limited thereto. For example, the refrigerant passage groove may be provided on only one side of the end surface plates 23.

In the above-described embodiment, description has been made by taking an example in which the radial refrigerant path 5b of the output shaft 5 extends radially outward from a central portion in the axial direction of the axial refrigerant path 5a, but the present invention is not limited thereto. For example, a plurality of radial refrigerant paths 5b may be disposed at intervals in the axial direction. For example, the radial refrigerant paths 5b may be disposed near an end portion in the axial direction of the rotor core 21. In this case, the radial flow paths 14a of the rotor internal flow paths 14 may be disposed near the end portion in the axial direction of the rotor core 21.

In the above-described embodiment, description has been made by taking an example in which the refrigerant passage groove extends from the apex part 30a of the refrigerant flow hole 30 toward the outer circumferential edge 23a, but the present invention is not limited thereto. For example, the refrigerant passage groove may extend from a portion other than the apex part 30a of the refrigerant flow hole 30 toward the outer circumferential edge 23a. For example, the refrigerant passage groove may extend from an outer end portion in the circumferential direction of the refrigerant flow hole 30 toward the outer circumferential edge 23a.

In the above-described embodiment, description has been made by taking an example in which the refrigerant flow hole 30 has a triangular shape having the apex part 30a on the radially outward side when viewed from the axial direction, but the present invention is not limited thereto. For example, the refrigerant flow hole 30 may have a shape other than a triangular shape when viewed from the axial direction. For example, the refrigerant flow hole 30 may have a rectangular shape when viewed from the axial direction.

While preferred embodiments of the present invention have been described above, the present invention is not limited thereto, and additions, omissions, substitutions, and other changes to the configurations can be made without departing from the gist of the present invention, and furthermore, the above-described modified examples can also be combined as appropriate.

What is claimed is:

1. A rotary electric machine comprising:
    a stator including a cylindrical stator core and a coil attached to the stator core; and
    a rotor disposed on a radially inward side of the stator, wherein
    the rotor includes:
    a rotor core having a refrigerant flow path through which a refrigerant is able to flow by axial cooling; and
    an end surface plate disposed at an end portion in an axial direction of the rotor core,
    the end surface plate includes:
    a refrigerant flow hole which communicates with the refrigerant flow path; and
    a refrigerant passage groove which connects together the refrigerant flow hole and an outer circumferential edge of the end surface plate, and
    a width of a portion of the refrigerant passage groove in contact with the outer circumferential edge is equal to or smaller than a width of a portion of the refrigerant passage groove in contact with the refrigerant flow hole when viewed from the axial direction.

2. The rotary electric machine according to claim 1, wherein the width of the portion of the refrigerant passage groove in contact with the outer circumferential edge is smaller than the width of the portion of the refrigerant passage groove in contact with the refrigerant flow hole when viewed from the axial direction.

3. The rotary electric machine according to claim 1, wherein a depth of the portion of the refrigerant passage groove in contact with the outer circumferential edge is equal to or smaller than a depth of the portion of the refrigerant passage groove in contact with the refrigerant flow hole.

4. The rotary electric machine according to claim 1, wherein, when viewed from the axial direction, the refrigerant flow hole has a triangular shape having an apex part on a radially outward side, and the refrigerant passage groove extends from the apex part toward the outer circumferential edge.

\* \* \* \* \*